C. W. BAKER.
COMBINED INTERNAL COMBUSTION ENGINE AND COMPRESSED AIR ENGINE.
APPLICATION FILED MAR. 10, 1910.
1,016,603.
Patented Feb. 6, 1912.
7 SHEETS—SHEET 1.
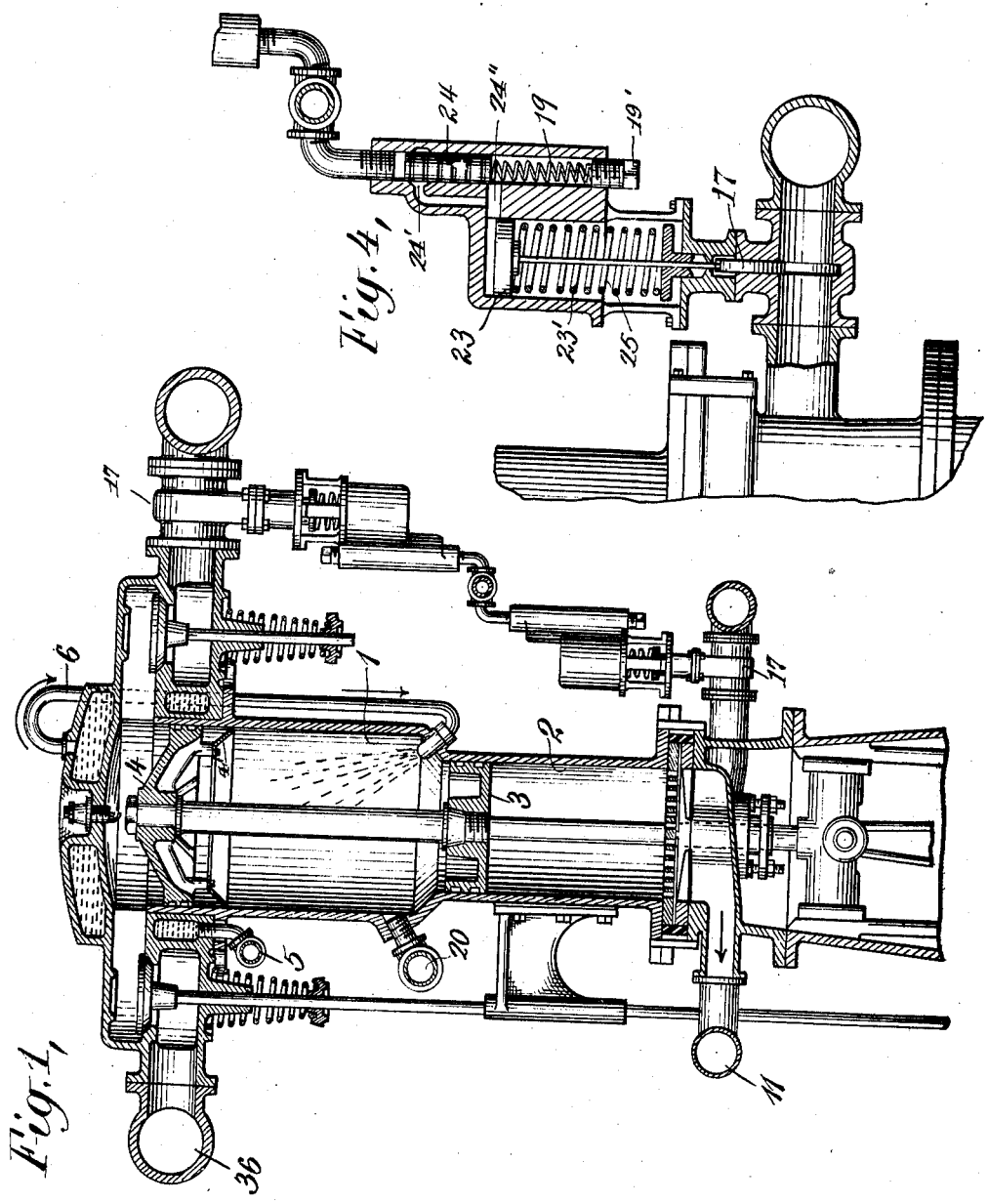
WITNESSES:
M. E. McNinch
W. G. Pauling
INVENTOR
Charles Whiting Baker
BY
Gifford Bull
ATTORNEYS C. W. BAKER.
COMBINED INTERNAL COMBUSTION ENGINE AND COMPRESSED AIR ENGINE.
APPLICATION FILED MAR. 10, 1910.
1,016,603.
Patented Feb. 6, 1912.
7 SHEETS—SHEET 2.
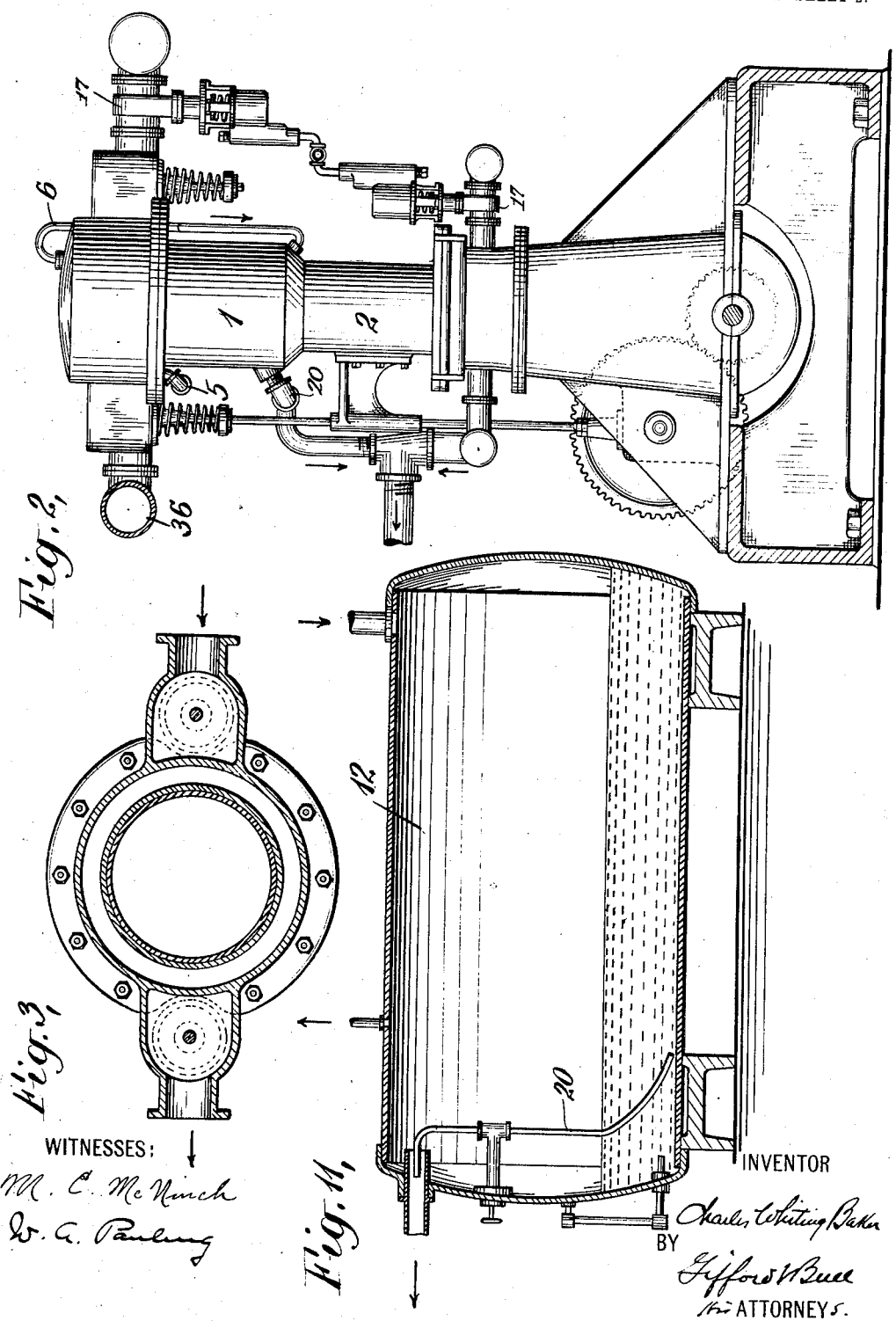

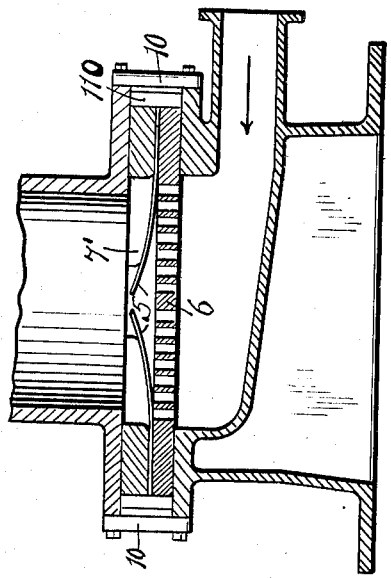
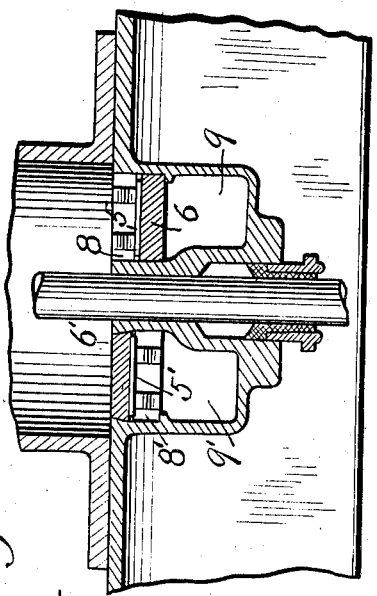
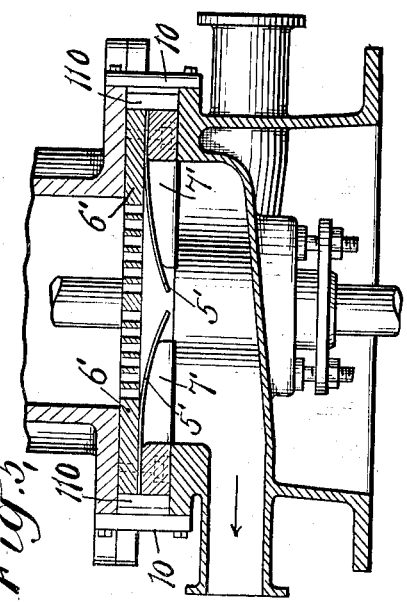
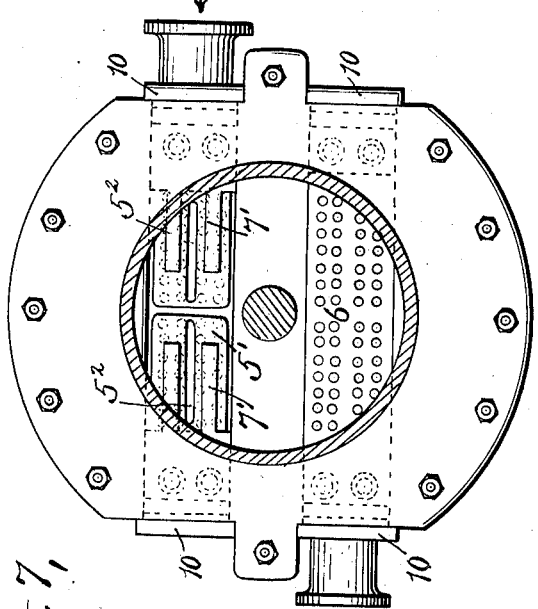

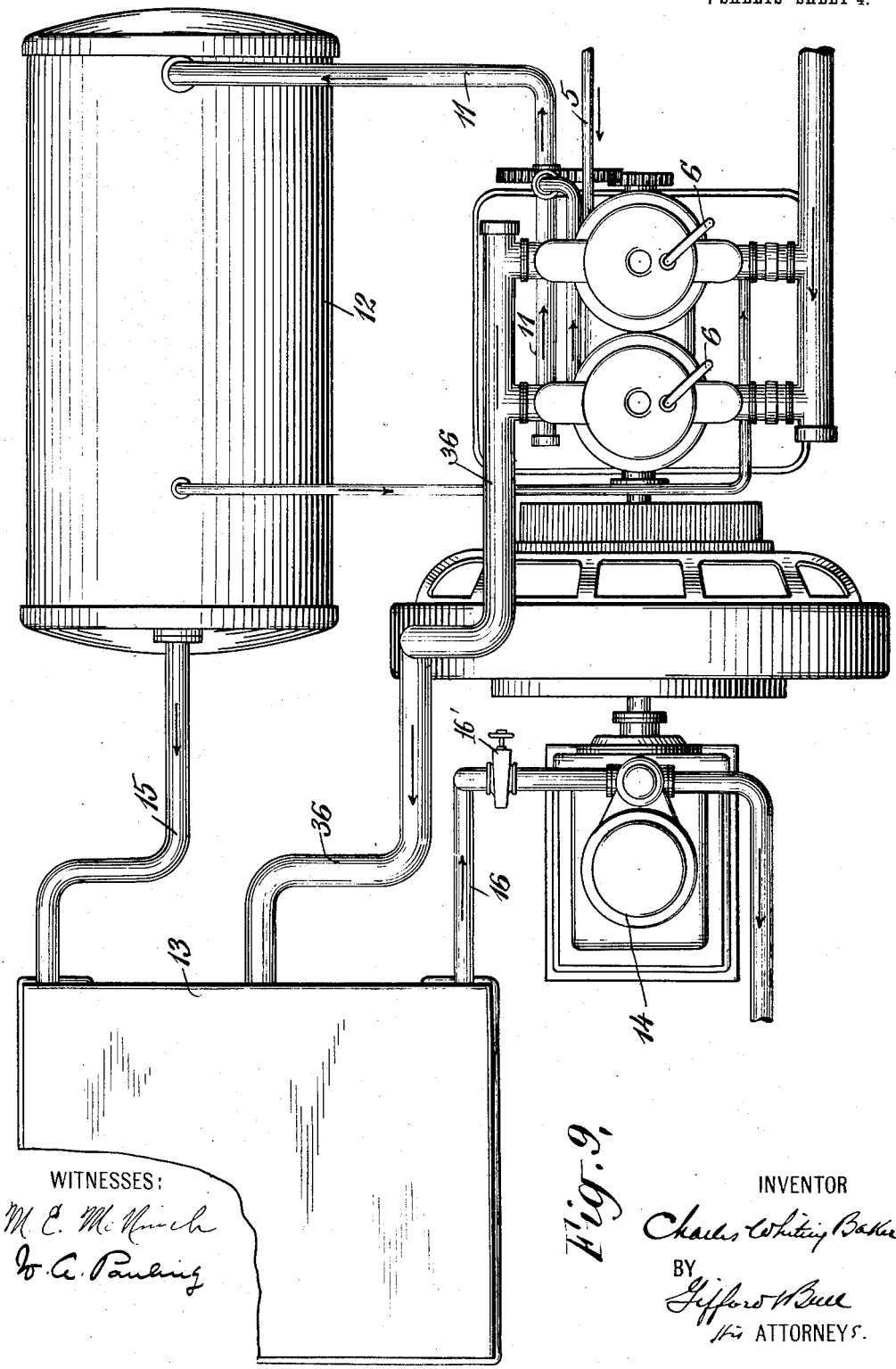

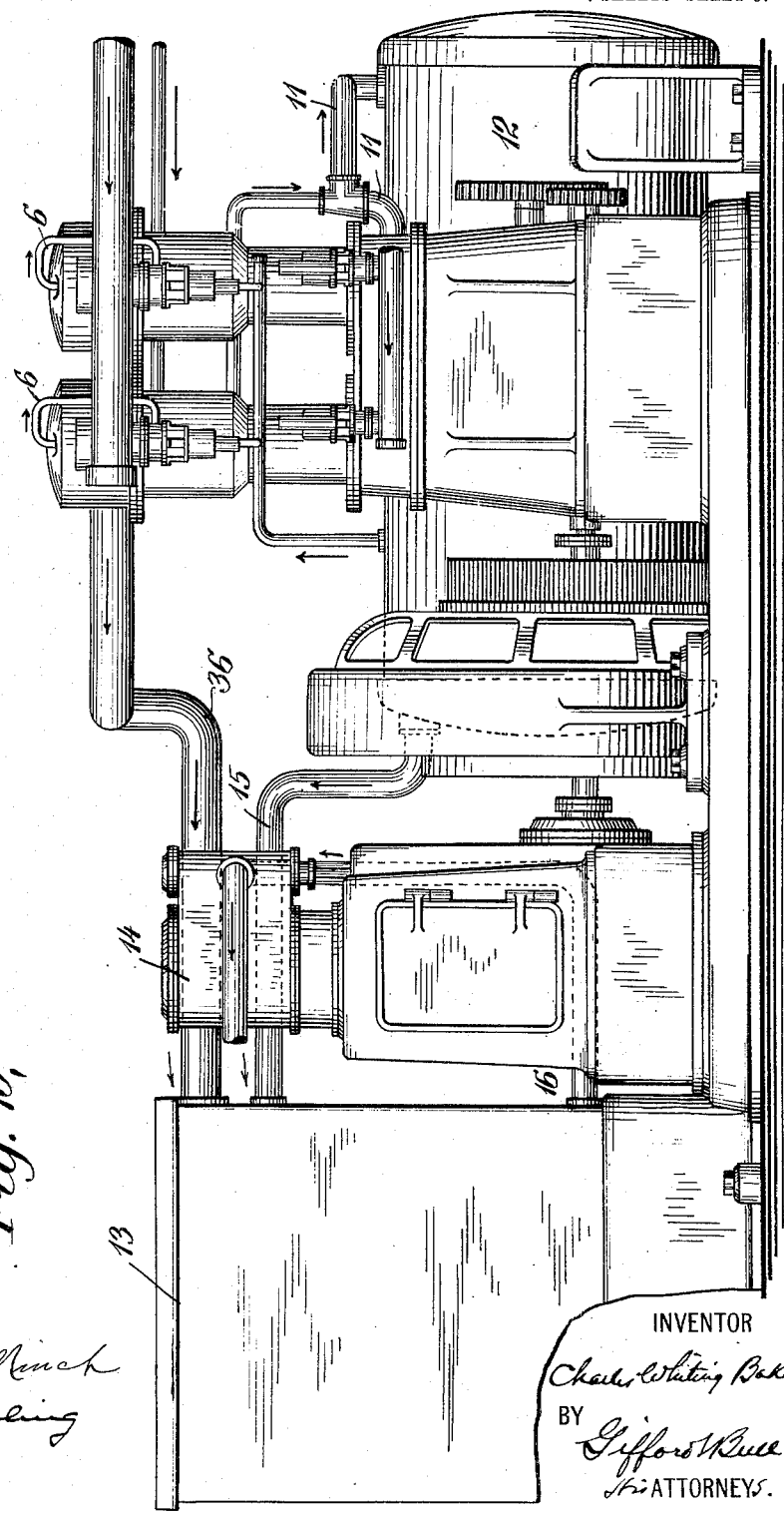

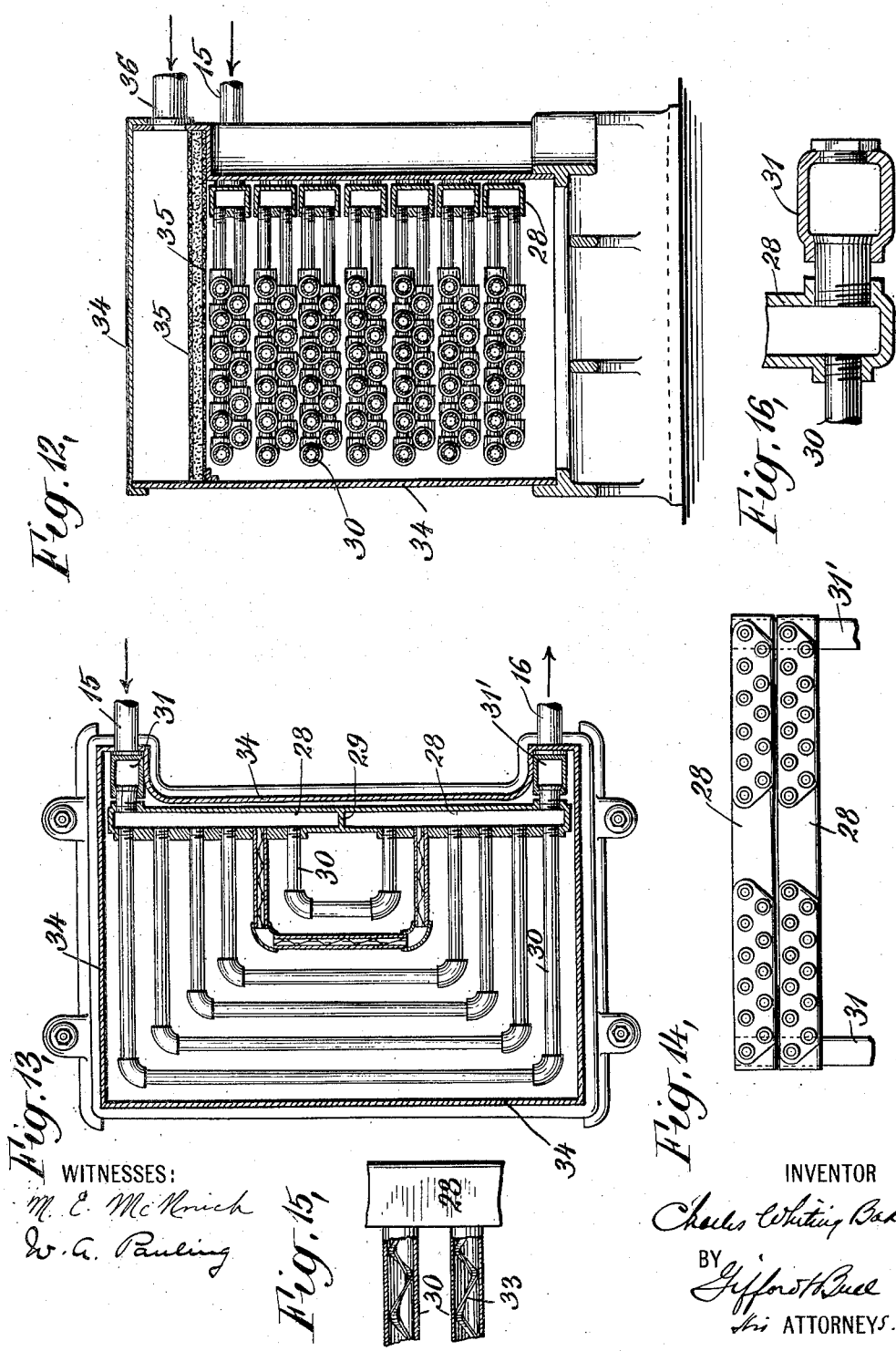

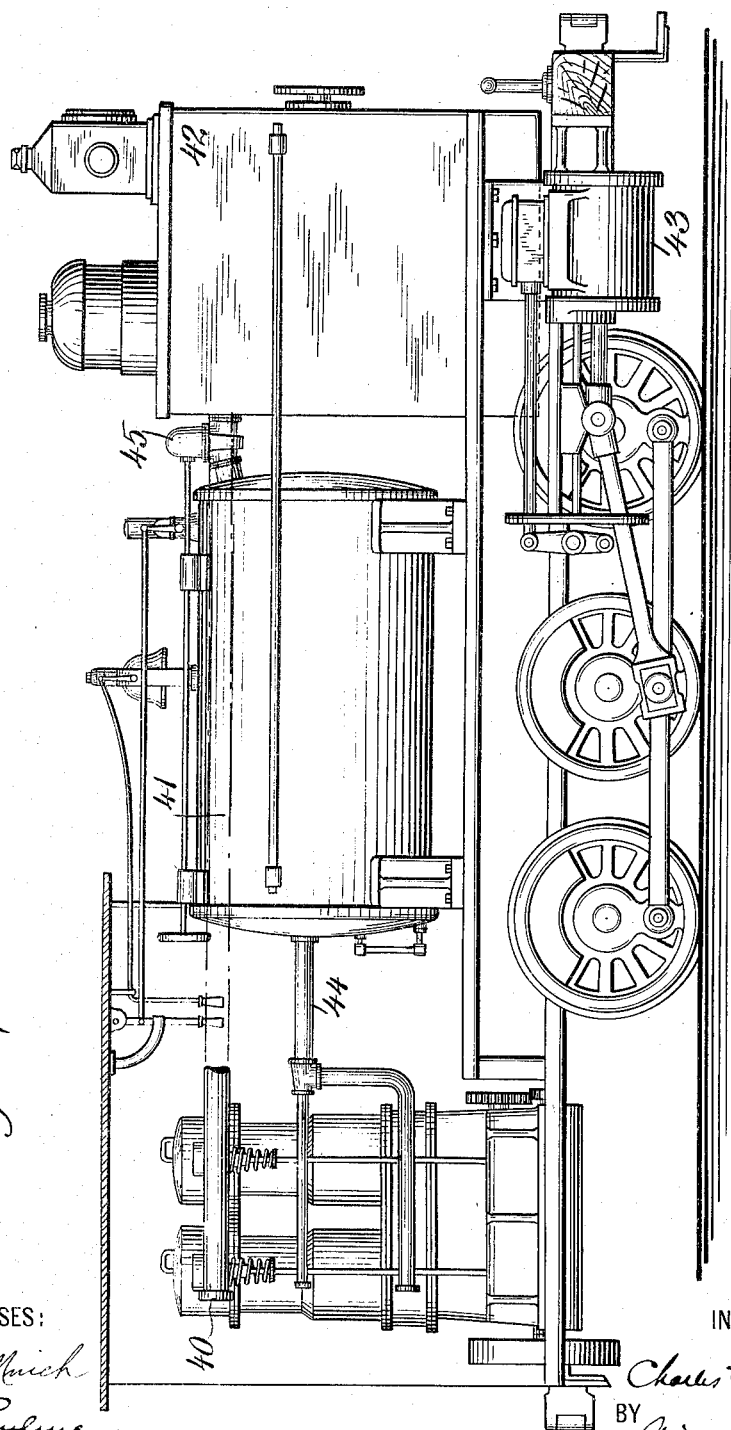

UNITED STATES PATENT OFFICE.

CHARLES WHITING BAKER, OF MONTCLAIR, NEW JERSEY.

COMBINED INTERNAL-COMBUSTION ENGINE AND COMPRESSED-AIR ENGINE.

1,016,603. Specification of Letters Patent. Patented Feb. 6, 1912.

Application filed March 10, 1910. Serial No. 548,367.

*To all whom it may concern:*

Be it known that I, CHARLES WHITING BAKER, a citizen of the United States, residing at Montclair, in the county of Essex and State of New Jersey, have invented certain new and useful Improvements in Combined Internal-Combustion Engines and Compressed-Air Engines, of which the following is a specification.

It is the object of my present invention to produce an engine of the internal-combustion type which will be self-starting without the use of auxiliary apparatus; which will have a more uniform turning moment than present gas engines; which will be more readily governed for sudden changes of load, with a larger reserve of power for sudden overloads; which will not require water-jackets upon its cylinders, nor internal cooling of its pistons, nor the use of radiators or other appliances to cool its water supply. Further, my improved engine utilizes for the production of power much of the heat which goes to waste in present types of gas engine, and it is therefore more economical and more powerful.

My invention employs many of the same elements that are found in my improved locomotive, application Serial No. 512,666, filed August 13, 1909, and my improved air-compressor described in a companion application Serial No. 548,366, filed March 10, 1910, but embodies also other elements for the production of a new and useful effect.

My invention is illustrated in the accompanying drawings in which:

Figure 1 is a vertical section through the cylinders of the gas engine and air-compressor. Fig. 2 is an end elevation of the same. Fig. 3 is a horizontal section through the upper end of the gas cylinder. Fig. 4 is an enlarged section of the automatic cut-off device by which the power developed by the engine is governed. Figs. 5, 6, 7 and 8 show the valves on the head of the air-compressing cylinder, Figs. 5, 6 and 8 being vertical sections and Fig. 7 a horizontal section through the barrel of the air cylinder. Fig. 9 is a plan and Fig. 10 an elevation of my improved engine arranged for driving an electric generator and showing the relations of several principal elements; viz., the gas-engine-air-compressor, the air and steam reservoir, the heater and the compressed air engine. Fig. 11 is a vertical section of the compressed air reservoir. Figs. 12 to 16 illustrate the heater in which heat from the exhaust gases from the gas engine is imparted to the compressed air and steam before it is utilized in driving the compressed air engine. Fig. 12 is a vertical section through the heater; Fig. 13 is a horizontal section; Fig. 14 is an elevation of one header, showing the staggering of the heating pipes attached; Fig. 15 is a section of two tubes showing the spiral retarding strips inserted; Fig. 16 is a detail of the connection between the vertical and horizontal headers; and Fig. 17 is a side elevation of a railway locomotive similar to that described in my application No. 512,666, but embodying the improvements herein described.

Similar figures denote like parts in the several views.

My internal-combustion engine, shown in section in Fig. 1, is of the vertical type, and is preferably built with two or more cylinders. Below each gas cylinder 1 and tandem therewith is placed a single-acting air-compressing cylinder 2. I so proportion the relative diameters of the air and gas cylinders 1 and 2 that only a part of the power developed in the gas cylinder will be expended in compressing air; the remainder will be expended in turning the shaft of the engine.

The valves attached to the air-compressing cylinder to govern the ingress and egress of air are adapted to operate at the high speeds suitable for the internal combustion engine. They are shown herewith in Figs. 1, 5, 6, 7 and 8. As shown in these figures, the head of the air cylinder has two channels 8, 8' extending across its face. Into these channels are slid the valve seats 6, 6' with the valves 5, 5' attached and also valve guards 7, 7', the three secured together filling and closing the ends of the channels or slots 8, 8' when the valves are in place. To close these slots or channels air-tight, caps 10, 10 are bolted on with packing 110 beneath, and this packing is compressed by a projection on the cap 10.

The valves 5, 5' are thin elastic rectangular plates held at one end between the valve-seats 6, 6' and the valve-guards 7, 7', and free to lift from the seats by bending. The seats 6, 6' are flat plates, perforated with rows of holes of such width that the thin valve can bridge across them when subjected to air pressure without sensible deflection. The valves 5, 5' have openings 5² midway between the holes in the valve seats. When the valve is lifted by the air pressure beneath it the air passes through the holes in the seat and around the sides and ends of the valves, as well as through the openings 5² through the valves. Beneath the valve seats are curved passages 9, 9' in the cylinder head leading to the inlet and outlet pipes respectively.

The relative position of the valves and valve seats on the inlet and outlet sides is, of course, reversed. The object of the above-described valve arrangement is to permit the efficient operation of the air compressor at the high speed adapted to the internal-combustion engine. The valves 5, 5' are made so thin and light that they open and close with almost no retardation from inertia; thus they give free passage to the air and yet return to their seats without shock the instant the flow of air ceases.

The air compressed is carried by a pipe 11 to a reservoir 12, Fig. 9, and passes thence through a pipe 15 to a heater 13 where it is exposed to the hot exhaust gases from the engine. The hot compressed air is used to drive an engine 14 of similar construction to an ordinary steam engine. This engine is attached to a crank on the same shaft as the cranks driven by the internal-combustion engine. The crank driven by the compressed-air engine 14 is placed at such an angle to the cranks driven by the internal-combustion engine that the impulses of the air engine will come midway between the impulses of the gas engine and a more uniform turning moment will be produced than would result from the action of the gas engine alone.

To govern the speed of the engine and insure uniformity under sudden changes of load, I attach a governor to the valve-gear of the air engine 14. This valve-gear may be of the ordinary, variable-cut-off type, or, in case extremely sudden changes of load are to be provided for, may be a reversing gear. The first effect of increased speed consequent on change of load, then, is to alter the valve-gear of the air engine 14 so as to reduce the power delivered by it and the consumption of air and thus to raise the pressure in the air reservoir 12. This increases the resistance against which the air-compressing pistons 3 (Fig. 1) work, and promptly reduces the speed to normal. On the other hand, if the engine slows down, the governor so alters the valve gear as to cause larger consumption of air by the air engine 14, thus lowering the pressure in the reservoir 12, and the resistance against which the air pistons 3 (Fig. 1) work, and so restoring the speed. While this gives a prompt variation in the power developed, to correspond to sudden changes of load, it is also necessary to vary the power developed in the gas cylinders and this can be done by throttling the fuel supply or by other usual methods of regulating gas engines, and in addition, in the case of a multi-cylinder engine, successive gas and air cylinders may be cut out of action as shown in Figs. 1, 2, 4, etc., herewith.

To the inlet pipes of each gas cylinder and each air-compressing cylinder are attached gate-valves 17. When these valves are closed they prevent the entry of gas or air and so prevent the gas cylinders from developing power and the air cylinders from compressing air. The closing of these valves is done by a piston 23 in a cylinder 23' acting in opposition to a spring 25. Compressed air piped from the reservoir 12 is admitted to or exhausted from the space behind the piston 23 through ports which are controlled by the movement of a piston 24 which is actuated in one direction by the pressure from the reservoir 12 and in the opposite direction by a spring 19, whose compression may be adjusted by the screw plug 19'. As the pressure in reservoir 12 rises, the spring 19 is compressed and the piston 24 is forced inward until it closes the port 24'' and uncovers the port 24', admitting compressed air behind the piston 23 and closing the gate-valve 17. When the pressure in reservoir 12 falls, the spring 19 forces the piston 24 upward, closes port 24' and opens port 24''. The compressed air behind the piston 23 escapes through port 24'' and the hole through screw plug 19' to the outer air. The gate-valve 17 is opened by the spring 25.

It will be seen that the pressure in the reservoir 12 at which the closing of the gate-valve 17 will occur is governed by the compression of spring 19. Therefore by adjusting the screw plug 19', the cutting out of air and gas cylinders may be made to occur at any desired reservoir pressure, and by adjusting the regulating apparatus attached to successive cylinders, one after the other may be cut out of action in sequence as the air pressure rises.

To start the engine from rest, it is only necessary to open the stop-valve 16' on the pipe 16 supplying compressed air to the air engine 14. This engine then turns the whole machine, utilizing the store of compressed air in the reservoir 12 until explosions begin in the cylinders of the internal-combustion engine.

The apparatus above described may be constructed with ordinary means for cooling the engine cylinders and the air compressing cylinders, such as water-jackets or a blast of air, and the advantages above set forth of self-starting, more uniform turning moment and accurate speed regulation will be secured.

In order to dispense with the use of water-jackets, to insure regular cooling of the piston, to avoid the necessity of special apparatus for cooling the jacket water, and to utilize the heat commonly wasted in the jacket water for the production of additional power, I cool the interior of the gas and air cylinders and their pistons by a water spray or splash. Referring to Fig. 1, I provide the upper head of the gas cylinder 1 with a water space into which the cooling water supply is delivered from the pipe 5. A pipe 6 from this water space leads to a nozzle which penetrates the chamber between the gas and air pistons at a point not swept by their motion, and delivers the water either as a spray or as a stream. In either case the water is dashed against every part of the cylinders 1 and 2 and the idle faces of the pistons 3 and 4 by the rapid reciprocation of these pistons. To further insure contact of the water with the walls of the gas cylinder 1 at the highest part of the stroke, I attach a ring 4' to the face of the gas piston 4, which forms an annular trap for holding the water in contact with the cylinder wall.

A large part of the water is evaporated to steam by contact with the hot cylinders and pistons. This steam I lead off through the pipe 20 to the air reservoir 12. The volume of this steam is added to the volume of the air in the reservoir, and also by its high specific heat it adds greatly to the effectiveness of the air when it is expanded in the cylinder of the air engine 14. If, however, all the water delivered into the space between the pistons 3 and 4 were there evaporated, the solids in the water might accumulate there as scale upon the pistons. I therefore supply to this space an amount of water considerably in excess of what can be evaporated and the surplus passes off with the steam to the air reservoir 12 in the form of particles of spray and foam, carrying with it there any solid particles which may be precipitated.

The water settles and accumulates in the bottom of the air reservoir (Fig. 11) and may be allowed to fill the lower part. This water is at a temperature corresponding to the pressure at which a portion of it was flashed into steam in its passage through the space between the pistons. In the reservoir 12 it performs a similar office to that of the water in a steam boiler, in providing a reserve of power for sudden heavy loads. If the reservoir pressure falls, the water gives off a large volume of steam, and, if the pressure rises, the steam entering from the engine is condensed by contact with the body of water in the reservoir and thus raises the water to a higher temperature. This highly heated water, furnishing a reserve of power for carrying sudden overloads in an internal combustion engine system, is one of the most important advantages of my invention.

As already described, the mingled air and steam from the reservoir 12 passes through a heater 13 on its way to the cylinders, and here receives a large increment of heat from the exhaust gases of the engine. In addition, a pipe 20 is carried from below the water level in the reservoir 12 to the outlet from the reservoir. When the throttle of the engine 14 is open, the rush of air outward from the reservoir through pipe 15 induces an outward flow of water from pipe 20 which is carried forward with the outrushing steam and air, and this water is evaporated into steam in its passage through the heater 13. In case more water should accumulate in the reservoir 12 than can be evaporated in this way, the amount of cooling water discharged into the cylinder 1 may be reduced.

In the case of very large engines, where the velocity would not be great enough for the lower piston 3 to throw the water against the face of piston 4, I deliver the cooling water as a fine spray directed against the under surface of the upper piston 4, which I here make of conical form. The part of the water not evaporated runs down the sloping cone of the piston into the trap formed by ring 4', which holds it in contact with the wall of the cylinder 1.

As it is no longer necessary for the gas piston perimeter to be cooled by contact with the cylinder walls, I make the gas piston 4 comparatively thin, like the piston of a steam engine. Further, I use packing rings of moderate pressure in this piston, since either a slight leakage of steam or water into the combustion space above piston 4 or of the intensely hot gases into the steam space during the short part of the engine cycle when the pressure above the piston 4 is higher than the pressure below, will have certain beneficial results. This small pressure of the piston rings reduces friction, and the water and steam in the space between the pistons 3 and 4 effectively lubricates them without the use of oil.

The heater 13 which I place between the air reservoir 12 and the engine 14, which utilizes the air, is made up of elements, each of which consists of a tube 28 which may be partially flattened on one side and with a partition 29 midway of its length. Into the flattened face of these elements are screwed two tiers of pipes 30, 30. Each of these pipes 30 is of U-shape, made of three straight pieces joined by elbows. These pipes vary in length so that substantially the whole of a rectangular space to one side of the header 28 is filled with the pipes. The upper and lower tiers of pipes 30, 30 in each header are staggered as shown in Fig. 14. To make up the heater, a number of these elements are superposed and are all connected to a vertical distributing header 31 into which the compressed air and steam from the reservoir flows. On the opposite side a similar vertical header 31' is connected and a pipe 16 from this leads to the engine 14. To increase the effectiveness of the heating surface in this heater, spirally twisted strips of metal 33 run the length of the tubes 30, 30 on the inside as shown in Figs. 13 and 15. This whole mass of piping is inclosed in a suitable casing 34 protected by non-conducting covering, and the hot exhaust gases from the engine are led around the pipes. To equalize the flow of the gases among the mass of pipes, I place on the top or the bottom two perforated plates or wire netting 35 (Fig. 12), and between these plates I place a layer of pebbles about the size of marbles. The exhaust gases from the engine are brought through a pipe 36 into a chamber on the opposite side of these pebbles from the heater, and percolate through the layer of pebbles into the heater. Any tarry matter in the gases lodges on the pebbles, and they also serve to equalize the heat in the entering gases, and prevent explosions occurring inside the heater. A similar arrangement of piping may be used for cooling compressed air, the pipes in this case being placed in a tank through which water is caused to flow, instead of in a casing through which hot gases are carried.

The apparatus as above described and shown is intended for the development of power, as for driving electric generators or other machinery. But by altering the proportions of the air and gas cylinders in the engine-compressor so that all the work done by the gas cylinders will be expended in compressing air, and at the same time separating the shaft of this engine from the shaft driven by the compressed-air engine, the apparatus becomes an air-compressing engine furnishing air and steam to a separate power-developing cylinder or cylinders, which may drive a locomotive engine or a hoisting engine or do any other useful work. This combination is particularly advantageous, however, for use on the improved locomotive described in my application Serial No. 512,666, because it dispenses with the necessity of cooling the supply of jacket water for the cylinders. It is believed to be impossible within the space available on a locomotive to cool the supply of jacket water necessary for an internal-combustion engine large enough to propel a large size railway locomotive. The heated water in the air reservoir is also of great value in steadying the pressure in the reservoir and furnishing a reserve for aiding the locomotive at times of greatest demand for power. Fig. 17 is a side elevation of a locomotive arranged on this system, 40 being the air-compressing engine, 41 the air and steam reservoir, 42 the heater and 43 the propelling cylinders. In this case I use two, four, six or other even number of cylinders on the gas engine and air-compressor, and secure perfect balancing by proper setting of the cranks and disposition of opposite rotating and reciprocating parts as in ordinary practice. The compressed air generated together with the steam and hot water discharged from the space between the gas and air pistons are carried by the pipe 44 into the reservoir 41. The amount of air delivered is proportioned to the demand made by the propelling cylinders upon the air reservoir 41, the inlet pipes to the gas and air cylinders having gate-valves which are opened and shut automatically according to the method shown herewith in Figs. 1, 2, 3, 4, etc. The heater 42 is placed on the front of the locomotive so that the compressed air after passing through it may go directly to the propelling cylinders. The throttle valve 45 is placed on the pipe leading from the reservoir 41 to the heater 42. Thus the air and steam which are expanded and cooled in passing through the throttle when the latter is partially open can take up more heat in the passage through the heater.

What I claim and desire to secure by Letters Patent of the United States is:—

1. The combination of an internal-combustion engine having air-compressing cylinders arranged tandem with the engine cylinders but absorbing a part only of its power, a reservoir to which the air from the compressing cylinders is directly piped, a reciprocating compressed air engine drawing its supply from the reservoir and driving the same shaft as the internal-combustion engine, and a heater separated from the engine in which the exhaust gas from the internal-combustion engine imparts heat to the compressed air in its passage from the reservoir to the air engine.

2. The combination of an internal-combustion engine, an air-compressor driven by it and absorbing a part only of its power, a reservoir for the compressed air, means for cooling the idle face of the engine's piston and the cylinder by a water spray or splash, with means for delivery of the hot water and steam generated into the reservoir, and an auxiliary engine driven by compressed air and steam from the reservoir.

3. The combination of an internal-combustion engine, an air-compressor driven by it and absorbing a part only of its power, a reservoir for the compressed air, means for cooling the idle face of the engine's piston and the cylinder by a water spray or splash, with means for delivery of the hot water and steam generated into the reservoir, an auxiliary engine driven by compressed air and steam from the reservoir, and a heater through which the steam and compressed air pass on their way from the reservoir to the engine.

4. The combination of an internal-combustion engine, an air-compressor driven by it and absorbing a part only of its power, a reservoir for the compressed air, means for cooling the idle face of the engine's piston and the cylinder by a water spray or splash, with means for delivery of the hot water and steam generated into the reservoir, an auxiliary engine driven by compressed air and steam from the reservoir, and a heater utilizing the exhaust gases of the internal-combustion engine through which the steam and compressed air pass on their way from the reservoir to the engine.

5. In an internal-combustion engine, means for cooling the cylinder and piston and utilizing the heat so obtained, consisting of a water jacket on the head and upper part of the engine cylinder, a pipe delivering a limited amount of water from said jacket space against the idle face of the piston and the cylinder walls, a pipe delivering the hot water and steam generated to a heater utilizing the exhaust gases from the engine, and an auxiliary engine in which the steam passing from the heater forms the working fluid.

6. In an internal-combustion engine, means for cooling the cylinder and piston and utilizing the heat so obtained, and the heat in the exhaust gases, consisting of a water jacket on the head and upper part of the engine cylinder, a pipe delivering a limited amount of water from the jacket space to a closed chamber on the idle side of the piston, a pipe carrying the hot water and steam generated in said chamber to a reservoir where it is stored under pressure, an auxiliary engine using steam from said reservoir, and a heater in which steam and hot water from the reservoir are heated in their passage to the auxiliary engine by exposure to the exhaust gases from the gas engine.

7. The combination of an internal combustion engine, a low pressure air compressor driven by said engine, means for cooling the idle faces of the piston and the inner surface of the cylinders of said engine and compressor by a water spray or splash, a reservoir to receive the compressed air and the steam produced in cooling the cylinders and pistons, pipes conveying the compressed air and steam to said reservoir, an engine adapted to use the steam and compressed air from the reservoir for developing power or for propulsion, and a heater utilizing the exhaust gases from the engine to heat the compressed air and steam in their passage from the reservoir to the engine.

8. The combination of an internal combustion engine, an air compressor driven by said engine, means for cooling the internal combustion engine by the evaporation of water, a reservoir for the compressed air and for the steam generated in cooling, a reciprocating engine utilizing the compressed air and steam to develop power, a heater through which the compressed air and steam pass on their way to said reciprocating engine, and means for conducting the exhaust gases from the internal combustion engine to said heater.

In testimony whereof I have hereunto signed my name in the presence of two subscribing witnesses.

CHARLES WHITING BAKER.

Witnesses:
 CHARLES S. JONES,
 M. E. McNINCH.